United States Patent
Bi et al.

(10) Patent No.: US 9,024,969 B2
(45) Date of Patent: *May 5, 2015

(54) METHOD AND DEVICE FOR PERFORMING USER-DEFINED CLIPPING IN OBJECT SPACE

(75) Inventors: Ning Bi, San Diego, CA (US); Lin Chen, San Diego, CA (US); Lingjun Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/538,445

(22) Filed: Jun. 29, 2012

(65) Prior Publication Data

US 2012/0268484 A1 Oct. 25, 2012

Related U.S. Application Data

(63) Continuation of application No. 11/531,205, filed on Sep. 12, 2006, now Pat. No. 8,237,739.

(51) Int. Cl.
 *G09G 5/00* (2006.01)
 *G06T 15/30* (2011.01)

(52) U.S. Cl.
 CPC .................................... *G06T 15/30* (2013.01)

(58) Field of Classification Search
 USPC .......................... 345/619, 620, 621, 623, 624
 See application file for complete search history.

(56) References Cited

U.S. PATENT DOCUMENTS

| | | | |
|---|---|---|---|
| 5,877,773 A | 3/1999 | Rossin et al. | |
| 5,889,997 A | 3/1999 | Strunk | |
| 5,986,669 A | 11/1999 | Kirkland | |
| 6,137,497 A * | 10/2000 | Strunk et al. | 345/620 |
| 6,219,071 B1 * | 4/2001 | Krech et al. | 345/503 |
| 6,229,553 B1 | 5/2001 | Duluk, Jr. et al. | |
| 6,545,679 B1 * | 4/2003 | Hussain et al. | 345/427 |
| 6,664,959 B2 * | 12/2003 | Duluk et al. | 345/422 |
| 6,664,962 B1 | 12/2003 | Komsthoeft et al. | |
| 6,686,924 B1 | 2/2004 | Mang et al. | |
| 6,717,576 B1 | 4/2004 | Duluk, Jr. et al. | |
| 6,734,874 B2 | 5/2004 | Lindholm et al. | |
| 6,771,264 B1 | 8/2004 | Duluk et al. | |
| 6,774,895 B1 * | 8/2004 | Papakipos et al. | 345/422 |
| 7,015,909 B1 * | 3/2006 | Morgan, III et al. | 345/426 |
| 7,111,156 B1 * | 9/2006 | Mang et al. | 712/228 |
| 7,215,344 B2 | 5/2007 | Baldwin | |
| 7,224,359 B1 * | 5/2007 | Papakipos et al. | 345/422 |

(Continued)

OTHER PUBLICATIONS

International Search Report and Written Opinion—PCT/US2007/078237, International Search Authority—European Patent Office—Sep. 3, 2009.

*Primary Examiner* — Abderrahim Merouan

(74) *Attorney, Agent, or Firm* — James R. Gambale, Jr.

(57) ABSTRACT

A method and device for performing and processing user-defined clipping in object space to reduce the number of computations needed for the clipping operation. The method and device also combine the modelview transformation of the vertex coordinates with projection transform. The user-defined clipping in object space provides a higher performance and less power consumption by avoiding generation of eye coordinates if there is no lighting. The device includes a driver for the user-defined clipping in the object space to perform dual mode user-defined clipping in object space when a lighting function is disabled and in eye space when the lighting function is enabled.

47 Claims, 10 Drawing Sheets

(56) References Cited

U.S. PATENT DOCUMENTS

| | | |
|---|---|---|
| 8,237,739 B2 | 8/2012 | Bi et al. |
| 2002/0030693 A1* | 3/2002 | Baldwin ........................ 345/620 |
| 2003/0009748 A1 | 1/2003 | Glanville et al. |
| 2003/0084181 A1* | 5/2003 | Wilt .............................. 709/233 |
| 2003/0095137 A1 | 5/2003 | Lu et al. |
| 2003/0112246 A1* | 6/2003 | Lindholm et al. ............ 345/519 |
| 2004/0130552 A1* | 7/2004 | Duluk et al. .................. 345/506 |
| 2004/0217960 A1* | 11/2004 | Wilt et al. ..................... 345/473 |
| 2007/0165035 A1* | 7/2007 | Duluk et al. .................. 345/506 |

* cited by examiner

METHOD AND DEVICE FOR PERFORMING USER-DEFINED CLIPPING IN OBJECT SPACE

This application is a continuation of U.S. application Ser. No. 11/531,205, filed Sep. 12, 2006, the entire content of which is incorporated herein by reference.

BACKGROUND OF THE INVENTION

1. Field of the Invention

This invention relates to three-dimensional graphics processing.

2. Background

In general, three-dimensional (3D) graphics applications display 3D objects in a two-dimensional (2D) space (e.g., a display screen). The pixels in a 2-dimensional graphic have the properties of position, color, and brightness. On the other hand, a 3D pixel adds a depth property that indicates where the point lies on an imaginary Z-axis. Texture is created as 3D pixels are combined, each with its own depth value.

Converting information about 3D objects into a bit map that can be displayed is known as rendering, and requires considerable memory and processing power. In the past, 3D graphics was available only on powerful workstations, but now 3D graphics accelerators are commonly found in personal computers (PC). The graphics accelerator contains memory and a specialized microprocessor to handle many of the 3D rendering operations. Open GL® (Open Graphics Library) for desktops defines an application programming interface (API) for writing applications that produce 3D and 2D computer graphics. The API includes hundreds of functions for drawing complex three-dimensional scenes from primitives.

User-defined clip planes permit for efficient early culling of non-visible polygons—increasing performance and saving power. The user-defined clipping is usually done in hardware in the PC graphics systems. It is relatively a new feature in handheld devices. OpenGL® ES is a subset of the desktop OpenGL which creates an interface between software and graphics. Furthermore, user-defined clipping is either done in software or in hardware in mobile phones. If user-defined clipping is done in software, user-defined clipping is usually done in eye coordinates. Vertices (vertex coordinates) are first transformed from object space into eye space. The transformed vertices are tested against the user-defined clipping planes in eye space. Vertices are assembled into primitives. If a primitive partially lies in the half-space of a clipping plane, the primitive will be clipped by the clipping plane. However, numerous computations are needed to transform the numerous vertices from the object space to the eye space.

For example, in 3D graphics applications, such as OpenGL® ES or OpenGL®, a user can specify multiple clipping planes. A clipping plane is an arbitrary plane in 3D space. Each plane defines a half-space. Any object or any portion of the object will be clipped if it does not lie in the half-space. Any object in the scene will be tested against all the clipping planes. This process is called user-defined clipping. Another type of clipping is called frustum clipping that clips objects against the eye frustum. Frustum clipping will not be described herein.

A current challenge is to implement the user-defined clipping using a 3D software engine found in a hand-held 3D imaging device without poor performance. The hand-held 3D imaging devices have limited battery power and processing capability. A significant number of computations are needed to transform a lot of vertices from the object space to the eye space, these computations reduce the performance of the 3D imaging device.

In a conventional user-defined clipping process in eye space shown in FIG. 1, such as provided by the OpenGL® ES engine, the vertex object coordinates, denoted as V_obj, of step S22 are transformed using a modelview transformation process at step S24. At step S24 the vertex object coordinates V_obj are converted into eye space to form vertex eye coordinates, denoted as V_eye, where the vertex object coordinates V_obj are multiplied by the modelview matrix M for the coordinates. The vertex eye coordinates V_eye are subjected to primitive assembling at one of steps S28 (if a polygon), S30 (if a line segment) and S32 (if a point). The primitive assembling for a polygon at step S28 and for a line segment at step S30 are further subjected to a flat shading process at step S34. If the shade model is flat shading, then the color of each vertex will be replaced with the color of the last vertex of the triangle or line. The output from the flat shading process of step S34 or the point assemble process of step S32 are subjected to the user-defined clipping process in eye space at step S40, if enabled. Enabling the clipping process at step S40 will be described in detail later.

The primitives can be a polygon, a line segment or point and can be clipped using a conventional user-defined clipping process shown in FIG. 1. These primitives can be clipped against a user clip plane at step S40. In clip coordinates, the view volume of step S44 is defined by $$-w_c \le x_c \le w_c$$

$$-w_c \le y_c \le w_c$$

$$-w_c \le z_c \le w_c$$

where $x_c$, $y_c$ and $z_c$ are clip coordinates.

The view volume can be further restricted by as many as n user-defined clip planes to generate the clip volume wherein n is an implementation dependent. Each user-defined plane specifies a half-space. The clip volume is the intersection of all such half-spaces with the view volume (Step S44). It should be noted that in ordinary OpenGL, user clipping can be done in either eye space or in the projection space. However, step S44 assumes that it is done in projection space. However, if no user-defined clip planes are enabled at step S38, the clip volume is the view volume at step S44. Hence, the output from the Flat shading process S34 (if the primitive is a polygon or a line segment) or the point assemble process of step S32 are subjected to a projection transform at step S42 without the user-defined clipping process of step S40.

A user-defined clip plane is specified at step S12 with the function $$\text{ClipPlane(plane,} \qquad \qquad \text{eqn[4])}$$

where the value of the first argument, plane, is a symbolic constant, CLIP_PLANEi, where i is an integer between 0 and n−1, indicating one of n user-defined clip planes; and eqn[4] is an array of four single-precision floating-point values. (OpenGL® requires double precision floating points.) The four single-precision floating-point values are the coefficients of a plane equation P of step S14 in object coordinates, denoted as p1, p2, p3 and p4. The current modelview matrix, denoted as Mc, is stored for the clip plane P at step S18. The inverse of the current modelview matrix Mc for the clip plane P is obtained or calculated at step S20 via an inverse matrix process. The resultant inverse matrix is denoted as Inv_Mc. The Inv_Mc is applied to these coefficients via multiplication, at the time they are specified at step S16, yielding P_eye as follows:

$$P\_eye = (p'_1 p'_2 p'_3 p'_4) = (p_1 p_2 p_3 p_4) Mc^{-1}$$

where Mc is the current modelview matrix; $Mc^{-1}$ is the Inv_Mc; the resulting plane equation is undefined if Mc is singular and may be inaccurate if Mc is poorly-conditioned; and P_eye is the plane equation coefficients in eye coordinates at step S16 which is followed by step S40. At step S40, all points with eye coordinates $(x_e \; y_e \; z_e \; w_e)^T$ that satisfy $$P\_eye^{T} * V\_eye \gtreqless 0 \text{ or}$$

$$(p'_1 * x_e + p'_2 * y_e + p'_3 * z_e + p'_4 * w_e) \gtreqless 0$$

lie in the half-space defined by the plane; points that do not satisfy this condition do not lie in the half-space where T is a transpose; and * denotes multiplication of a matrix or vector.

At step S36, the user-defined clip planes are enabled with an Enable command. Alternately, the clipping could be disabled with the Disable command. At step S38, a determination is made whether the user-defined clip planes are enabled or disabled. If the determination is "YES" (meaning enabled), the output from the flat shading process S34 (if a polygon or line segment assemble of step S28 or S30) or the point assemble process S32 is subject to clipping at step S40 in eye space. The value of the argument to either command is CLIP_PLANEi where i is an integer between 0 and n; specifying a value of i enables or disables the plane equation with index i. The constants obey ClipPlane I=ClipPlane0+i.

Regarding step S32, if the primitive under consideration is a point, then clipping passes the primitive unchanged if the primitive lies within the clip volume; otherwise, the primitive is discarded. If the primitive is a line segment at step S30, then clipping does nothing to the primitive if the primitive lies entirely within the clip volume and discards the primitive if it lies entirely outside the volume. If part of the line segment lies in the volume and part lies outside, then the line segment is clipped and new vertex coordinates are computed for one or both vertices. A clipped line segment endpoint lies on both the original line segment and the boundary of the clip volume.

The clipping process at step S40 yields a value, $0 \leq t \leq 1$, for each clipped vertex. If the coordinates of a clipped vertex are D and the original vertices' coordinates are $D_1$ and $D_2$, then t is given by $$D = t D_1 + (1+t) D_2$$

where the value of t is used in color and texture coordinate clipping.

If the primitive is a polygon at step S28, then the primitive is passed if every one of its edges lies entirely inside the clip volume and is either clipped or discarded otherwise. Polygon clipping may cause polygon edges to be clipped, but because polygon connectivity must be maintained, these clipped edges are connected by new edges that lie along the clip volume's boundary. Thus, clipping may require the introduction of new vertices into a polygon. Edge flags are associated with these vertices so that edges introduced by clipping are flagged as boundaries (edge flag TRUE), and so that original edges of the polygon that become cut off at these vertices retain their original flags.

If it happens that a polygon intersects an edge of the clip volume's boundary, then the clipped polygon must include a point on this boundary edge. This point must lie in the intersection of the boundary edge and the convex hull of the vertices of the original polygon.

A line segment or polygon whose vertices have $w_c$ values of differing signs may generate multiple connected components after clipping. Some implementations are not required to handle this situation. That is, only the portion of the primitive that lies in the region of $w_c > 0$ need be produced by clipping.

Primitives rendered with clip planes must satisfy a complementarily criterion. Suppose a single clip plane with coefficients $(p'_1 \; p'_2 \; p'_3 \; p'_4)$ (or a number of similarly specified clip planes) is enabled and a series of primitives are drawn. Next, suppose that the original clip plane is re-specified with coefficients $(-p'_1 \; -p'_2 \; -p'_3 \; -p'_4)$ (and correspondingly for any other clip planes) and the primitives are drawn again. In this case, primitives must not be missing any pixels, nor may any pixels be drawn twice in regions where those primitives are cut by the clip planes.

Clipping requires plane equations (each consisting of four single-precision floating-point coefficients) and corresponding bits indicating which of these user-defined plane equations are enabled. In the initial state, all user-defined plane equation coefficients are zero and all planes are disabled.

In view of the above description of the user-defined clipping process in eye space, there is a need to reduce the computations for user-defined clipping in 3D imaging devices having a 3D graphics software and/or hardware engine.

There is also a need to perform the user-defined clipping in the object space to avoid transforming vertices from the object space into the eye space. Most cases in 3D gaming content processing require less computation to transform a few user-defined clip planes from the eye space to the object space than to transform a lot of vertices from the object space to the eye space.

Furthermore, there is a need to avoiding generation of eye coordinates if lighting is disabled.

SUMMARY OF THE INVENTION

In view of the above, it is an object of the present invention to provide for user-defined clipping in object space which consumes less power in a mobile or hand-held communication or computing device with limited power capability.

A further object of the present invention is to provide the user-defined clipping in the object space to avoid transforming vertices from the object space into the eye space to reduce the number of computations ordinarily required by user-defined clipping in the eye space.

A further object of the present invention is to provide in most of the cases in 3D gaming contents, less computations to transform a few user-defined clip planes from the eye space to the object space than required to transform a lot of vertices from the object space to the eye space.

The foregoing and other objects of the present invention are carried out by an object space user-defined clipping driver comprising: a primitive assembling module operable to primitive assemble vertex coordinates in object space; and a user-defined clipping module operable to create clipped vertex coordinates in the object space using clip planes (P_obj) in the object space and the primitive assembled vertex coordinates in the object space.

The clipped and non-clipped vertex coordinates in the object space are transformed from the object space directly into projection space by one vector to matrix multiplication. When lighting is disabled and user-defined clipping is disabled or enabled, the two transforms (modelview and projection) can be combined into one 4×4 matrix rather than into two 4×4 matrices.

The driver may be implemented in software, hardware or a combination of hardware and software.

Alternatively, the clipped vertex coordinates in the object space are not transformed from the object space to the eye space until immediately before projection transformation.

A further aspect of the present invention is to provide a program code executable by a processor and having program instructions which upon execution are operable to primitive assemble vertex coordinates in object space. The code is also operable to perform user-defined clipping to create clipped vertex coordinates in the object space using clip planes (P_obj) in the object space and the primitive assembled vertex coordinates in the object space.

A further aspect of the present invention is to provide a 3D graphics engine comprising an object space user-defined clipping driver operable to perform user-defined clipping of vertex coordinates in object space when a lighting function is disabled in the 3D graphics engine. The 3D graphics engine also includes a graphics core for transforming the clipped vertex coordinates in the object space into projection space.

A still further aspect of the present invention is to provide a program code having program instructions executable by a processor, wherein upon execution the program instructions are operable to perform vertex coordinate processing of vertex coordinates in eye space when lighting is enabled and perform vertex coordinate processing of vertex coordinates in object space when lighting is disabled.

The program instructions operable to perform the vertex processing in the object space is operable to perform primitive assembling in the object space using the vertex coordinates in the object space and user-defined clipping in object space.

The program instructions operable to perform the vertex processing in the eye space is operable to perform primitive assembling in the eye space using the vertex coordinates in the eye space and user-defined clipping in eye space.

A still further aspect of the present invention is to provide a 3D imaging device comprising determining means for determining whether a lighting function is enabled or disabled, eye space processing means for processing vertex coordinates in eye space when the lighting function is enabled, and object space processing means for processing vertex coordinates in object space when the lighting function is disabled.

The object space processing means performs primitive assembling in the object space using the vertex coordinates in the object space and user-defined clipping in the object space.

The eye space processing means performs primitive assembling in the eye space using the vertex coordinates in the eye space and user-defined clipping in the eye space.

The object space processing means includes means for transforming into projection space clipped and non-clipped vertex coordinates in the object space directly by one vector to matrix multiplication. When lighting is disabled and user-defined clipping is disabled or enabled, the two transforms (modelview and projection) can be combined into one matrix rather than into two matrices.

A further aspect of the present is a method for processing object space user-defined clipping comprising the steps of: converting clip planes (P_eye) in eye space to clip planes (P_obj) in object space; and performing user-defined clipping to create clipped vertex coordinates in the object space using the clip planes (P_obj) in the object space and the vertex coordinates in the object space.

A still further aspect of the present invention is a method for dual mode processing user-defined clipping comprising the steps of: determining whether a lighting function is enabled or disabled; performing object space vertex coordinate processing with object space user-defined clipping to create clipped vertex coordinates in object space when the lighting function is disabled; and performing eye space vertex coordinate processing with eye space user-defined clipping to create clipped vertex coordinates in eye space when the lighting function is enabled;

The method for dual mode processing user-defined clipping further comprises the step of: transforming the clipped vertex coordinates in the object space and non-clipped vertex coordinates in the object space directly into projection space.

An advantage of the present invention is higher performance and less power consumption by avoiding generation of eye coordinates if lighting is disabled.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement shown. In the drawings.

DETAILED DESCRIPTION OF THE PREFERRED EMBODIMENTS

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

The preferred embodiment of the 3D imaging device according to the present invention is described below with a specific application to a method for user-defined clipping in object space. The 3D imaging device may be a personal computer (PC) 3D graphics system, a handheld computing device such as a personal digital assistant (PDA), or a mobile phone which employs a 3D graphics application. However, it will be appreciated by those of ordinary skill in the art that the present invention is also well adapted for other types of computing devices with 3D graphics applications such for Game applications, simulator graphics and virtual reality graphics. The present invention implementation is suited for a user-defined clipping process in a 3D software engine.

Figure 3:
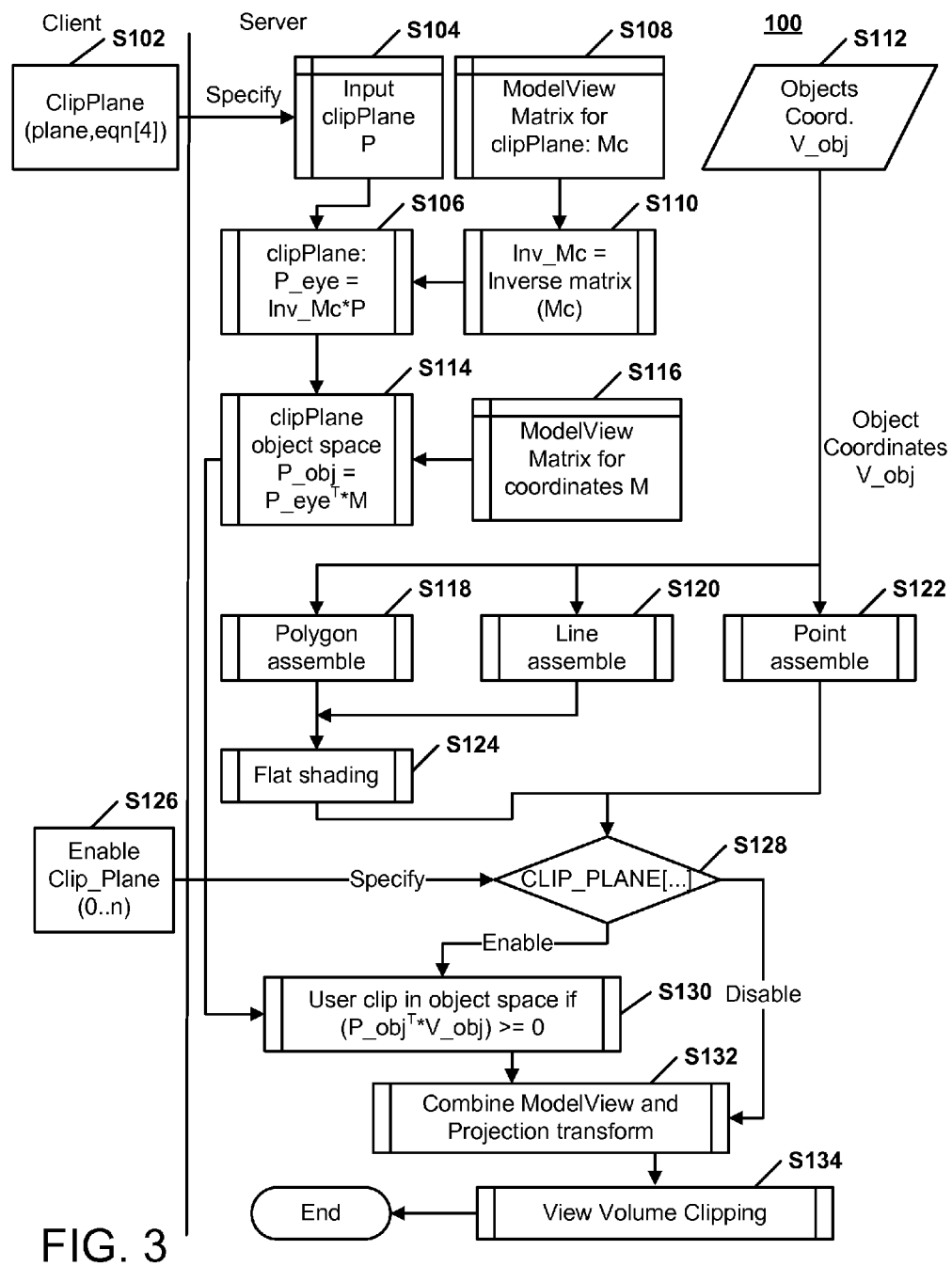
FIG. 3 illustrates a flow diagram of a user-defined clipping process in object space according to the present invention.

Referring now to the drawings in detail, wherein like numerals are used to indicate like elements throughout, there is shown in FIG. 3 an embodiment of a method for user-defined clipping in object space, generally designated at 100, according to the present invention.

Figure 4:
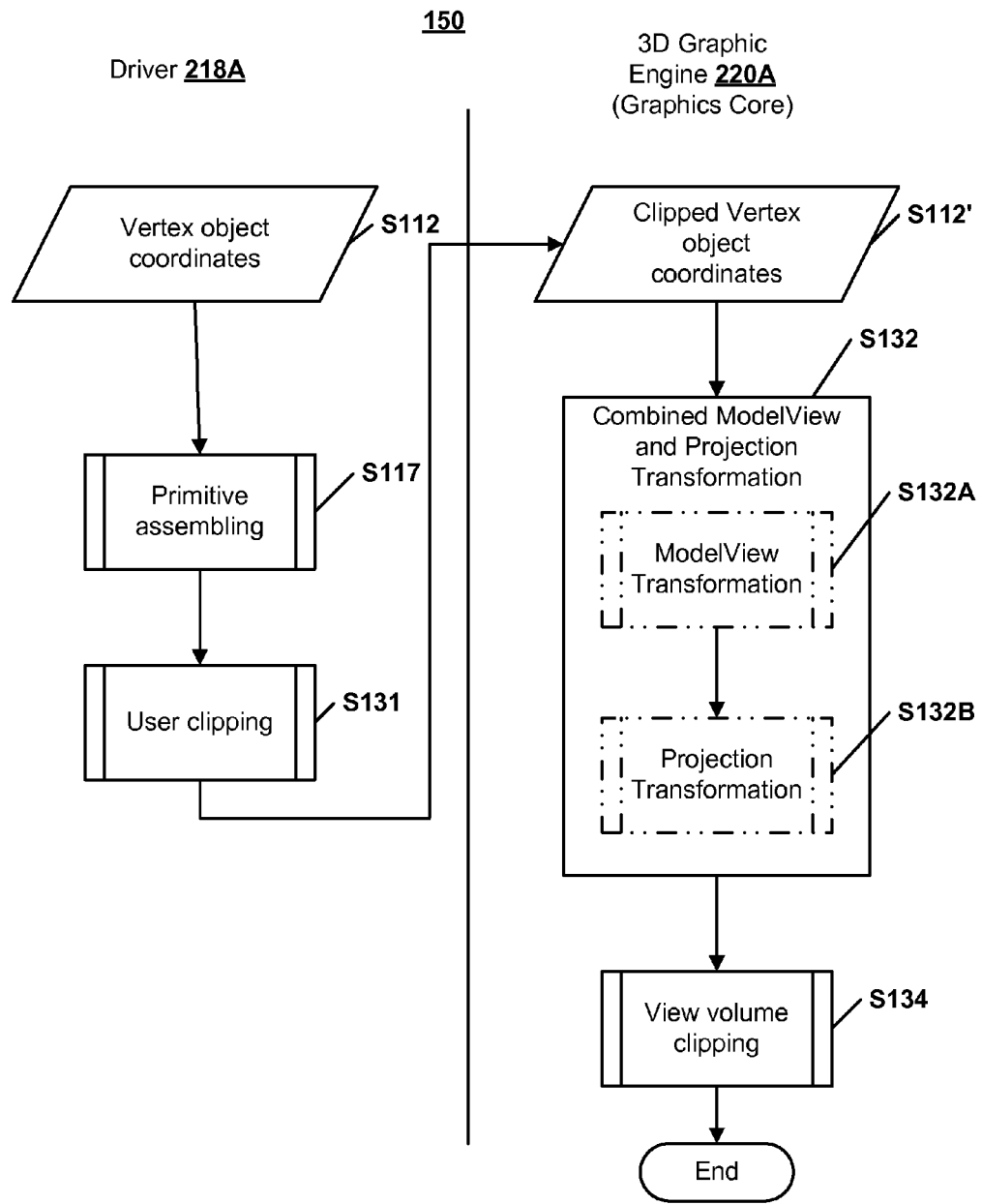
FIG. 4 illustrates a flowchart of a vertex process pipeline with user-defined clipping in object space according to the present invention.

As best shown in FIG. 4, the method for user-defined clipping in object space 100 includes a vertex process pipeline 150 with user-defined clipping in object space when lighting is disabled. The method 100 identifies data for vertex object coordinates, denoted as V_obj, at step S112. Thereafter, the vertex object coordinates V_obj are subjected to primitive assembling at one of steps S118 (if a polygon), S120 (if a line segment) and S122 (if a point). The primitive assembling for a polygon at step S118 and for a line segment at step S120 are subjected to a flat shading process at step S124. If the shade model is flat shading, then the color of each vertex will be replaced with the color of the last vertex of the triangle or line. The output from the flat shading process of step S124 or the point assemble process of step S122 is subjected to the user-defined clipping process if enabled by step S126.

The view volume may be further limited by as many as n user-defined clip planes to generate the clip half-space in the clipping process S130 wherein n is implementation dependent. Each user-defined plane specifies a half-space. The clip volume is the intersection of all such half-spaces with the view volume (Step S134). However, if no user-defined clip planes are enabled at step S126, the clip volume is the view volume at step S134 (subject to combined modelview and projection transformation).

Clipping requires plane equations (each consisting of four single-precision floating-point coefficients) and corresponding bits indicating which of these user-defined plane equations are enabled. In the initial state, all user-defined plane equation coefficients are zero and all planes are disabled.

Step S128 is followed by step S132, if the clip plane is disabled. At step S132, the output from the Flat shading process S124 (if the primitive is a polygon or a line segment) or the point assemble process of step S122 are subjected to both Modelview and projection transform at step S132 without the user clipping of step S130. Step S132 is followed by step S134 where a view volume clipping process takes place defined by $$-w_c \leq x_c \leq w_c$$

$$-w_c \leq y_c \leq w_c$$

$$-w_c \leq z_c \leq w_c$$

where $x_c$, $y_c$ and $z_c$ are clip coordinates. Step S134 ends the method 100.

Figure 2:
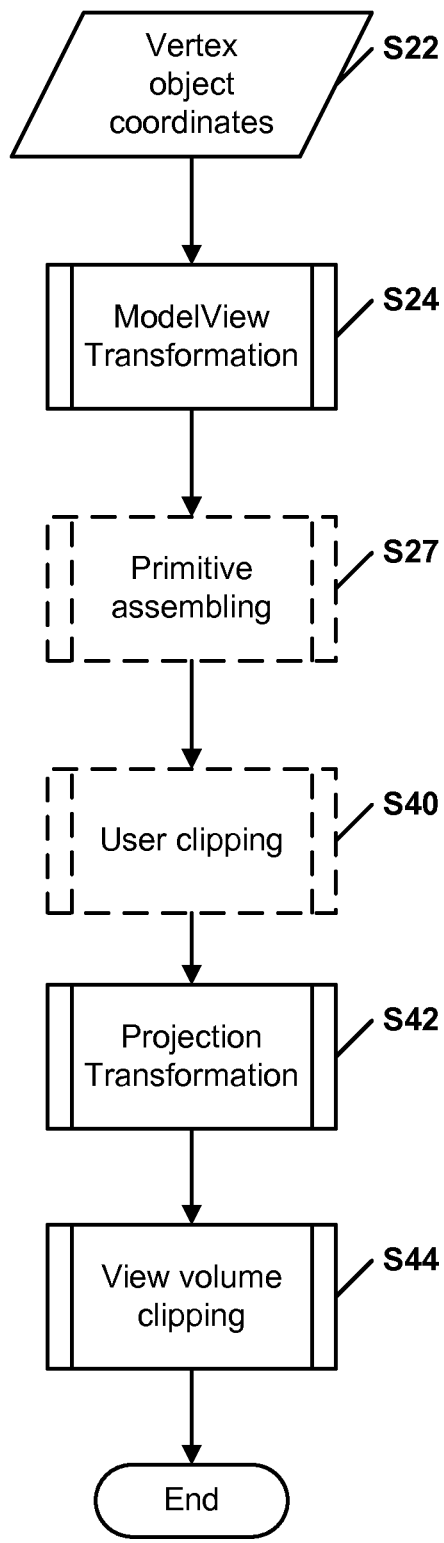
FIG. 2 illustrates a flowchart of a conventional vertex process pipeline with user-defined clipping in eye space.

Referring now to FIG. 2, in the conventional vertex process pipeline 50 with user-defined clipping in eye space, the pipeline 50 includes vertex object coordinates of step S22 which is followed by step S24. At step S24, a modelview transformation process takes place where the vertex object coordinates in object space are converted to eye space. Thereafter, step S24 is followed by primitive assembling process S27 which includes, in general, steps S28, S30, S32 and S34. The primitive assembling process S27 is followed by the user clipping process S40 (assuming clipping is enabled) which in turn is followed by a projection transformation process at step S42. Step S42 is followed by step S44 where a process for view volume clipping can take place. Step S44 ends the pipeline 50.

On the other hand, the vertex process pipeline 150 with user-defined clipping in object space is split, as best seen in FIG. 4, wherein the driver 218A (FIG. 7A) performs the primitive assembling in object space at step S117 followed by a user-defined clipping process in object space at step S131 (assuming that an enable command has been received). Step S117 includes steps S118, S120, S122 and S124 and step S131 includes steps S102, S104, S106, S108, S110, S114, S116, S126, S128 and S130. A 3D graphics engine 220 may be implemented as a software graphic engine or a hardware graphics engine and provides the Graphics Core. The 3D graphics engine 220A is shown separate from the program instructions 216A but would include suitable program instructions (not shown). In the embodiment shown in FIG. 4, FIG. 5A and FIG. 7A, the driver 218A is generally implemented as software. In the 3D graphics engine 220A, the vertex object coordinates of step S112' are still in object space but are clipped vertex object coordinates, denoted as CV_obj, and need to be transformed to projection space vertex coordinates using a combined modelview and projection transformation process of step S132, as will be described in more detail later using a single matrix such as a single 4×4 matrix. Some vertex coordinates (V_obj) passing through the user clipping step S131 are not clipped as the result of a plane being disabled (Step S128 to S132) or if the condition in step S130 is not met. These vertex coordinates are non-clipped vertex coordinates (V_obj) in the object space. Thus, the vertex coordinates of step S112' may provide data that is both CV_obj and V_obj to step S132

Figure 1:
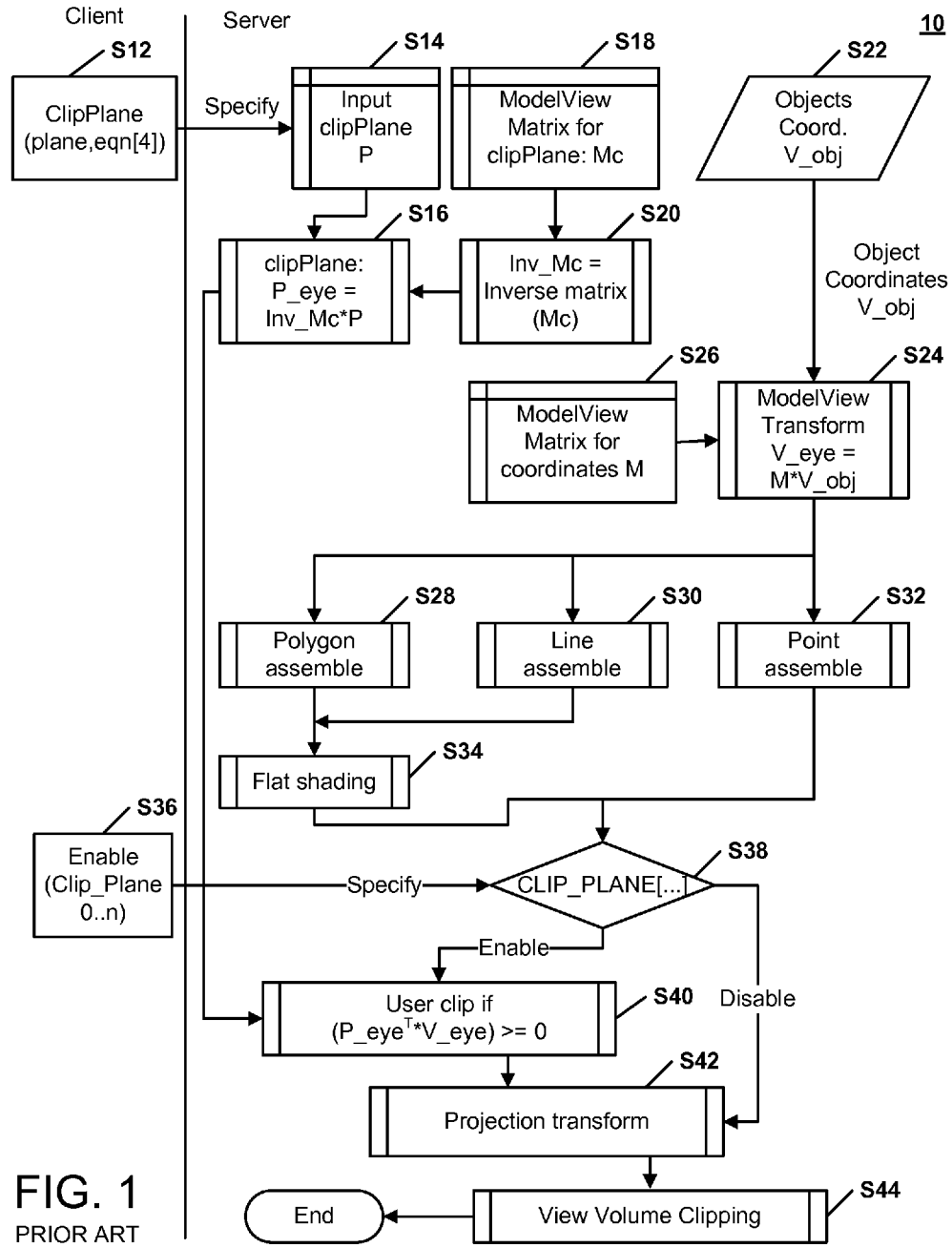
FIG. 1 illustrates a flow diagram of a conventional user-defined clipping process in eye space.

Alternately, the combined modelview and projection transformation process S132 may include a two step process denoted at steps S132A (shown in phantom) which uses the same equation as step S24 of FIG. 1. The modelview transform of step S132A is the same as the modelview transformation at step S24. Step S132A converts the clipped vertex object coordinates into eye space immediately before the projection transformation process of step S132B (shown in phantom). This two step process requires two (2) separate matrices. Step S132 or S132B is followed by the view volume clipping process of step S134.

Referring now to the combined modelview and projection transformation process of step S132, assume the following:

$$V\_eye = V\_obj * MVT\_matrix$$

where MVT_matrix is the modelview transform matrix. Since V_eye for user clipping is not used, MVT_matrix and Projection_matrix are combined into one matrix, MVTPRJ_matrix. Projection coordinates can be calculated as $$V\_prj = CV\_obj * MVTPRJ\_matrix \text{ or}$$

$$V\_prj = V\_obj * MVTPRJ\_matrix$$

where CV_obj is the clipped vertex coordinates in the object space; and V_obj are non-clipped vertex coordinates in object space; V_prj is the all vertex coordinates in projection space; and MVTPRJ_matrix is the combined MVT_matrix and Projection_matrix.

The pipeline 150 performs the user-defined clipping in the object space to avoid transforming vertices from the object space into the eye space. In most of the cases in 3D gaming contents, pipeline 150 requires less computation to transform a few user-defined clip planes from the eye space to the object space than to transform a lot of vertices from the object space to the eye space.

Moreover, in the pipeline 150, the modelview transform can be combined with the projection transform denoted at step S132. In this case, after the user-defined clipping process of step S131, clipped vertex coordinates are transformed from the object space directly into the projection space by one vector to matrix multiplication rather than two. In ordinary OpenGL®, two transformations may be combined when both lighting and user-defined clipping are disabled. In the exemplary embodiment, the two transformations can be combined as long as lighting is disabled. Thus, user-defined clipping can be either disabled or enabled. As can be appreciated, using a single matrix reduces the computations to achieve the clipped vertex coordinates into projection space.

Referring again to FIG. 3, the user can specify multiple clipping planes at step S102. A clipping plane is an arbitrary plane in 3D space. Each plane defines a half-space. In the user-defined clipping, any object or any portion of the object will be clipped if it does not lie in the half-space. Any object in the scene will be tested against all the clipping planes.

At step S102, a user-defined clip plane is specified by calling a function with $$\text{ClipPlane(plane,} \qquad\qquad\qquad \text{eqn[4])}$$

where the value of the first argument, plane, is a symbolic constant, CLIP_PLANEi, where i is an integer between 0 and n−1, indicating one of n user-defined clip planes; and eqn[4] is an array of four floating-point values. The four floating-point values are the coefficients of a plane equation P of step S104 in object coordinates denoted as $p_1$, $p_2$, $p_3$ and $p_4$. The current modelview matrix, denoted as Mc, is stored for a clip plane at step S108. The inverse of the current modelview matrix Mc for a clip plane is obtained or calculated at step S110 via an inverse matrix process. The inverse matrix is denoted as Inv_Mc. The Inv_Mc is applied to these coefficients via multiplication, at the time they are specified at step S106, yielding P_eye defined by $$P\_eye = (p'_1 p'_2 p'_3 p'_4) = (p_1 p_2 p_3 p_4) Mc^{-1}$$

where Mc is the current modelview matrix; $Mc^{-1}$ is the inverse of the matrix Mc denoted as Inv_Mc; the resulting plane equation is undefined if Mc is singular and may be inaccurate if Mc is poorly-conditioned; and P_eye is the plane equation coefficients in eye coordinates.

The plane equation coefficients in eye space P_eye of the step S106 are converted to object space at step S114 using modelview matrix coordinates M. The modelview matrix coordinates M of step S116 is the same as the matrix coordinates of step S26. Furthermore, with regard to step S132A, the modelview transformation can be the same as step S26. The conversion of the plane equation coefficients in eye space to object space is defined by $$P\_obj = (p'_1 p'_2 p'_3 p'_4)^T M \text{ or}$$

$$P\_obj = P\_eye^T * M = (p_{o1} p_{o2} p_{o3} p_{o4})$$

where P_obj is the plane equation coefficients in object space; T represents the transpose of the matrix or vector; and * represents matrix multiplication.

Step S114 is followed by step S130, where all points with vertex object coordinates $V\_obj=(x_o\ y_o\ z_o\ w_o)$ that satisfy $$P\_obj^T * V\_obj >= 0$$

lie in the half-space defined by the plane; points that do not satisfy this condition do not lie in the half-space.

At step S126, the user-defined clip planes are enabled with an Enable command. Alternately, the user could disable clip planes with the Disable command. At step S128, a determination is made whether the user-defined clip planes are enabled or disabled. If the determination is "YES" (meaning enabled), the output from the flat shading process S124 (if a polygon or line segment assemble of step S118 or S120) or the point assemble process S122 is subject to clipping at step S130 in object space. The value of the argument to either command is CLIP_PLANEi where i is an integer between 0 and n; specifying a value of i enables or disables the plane equation with index i. The constants obey ClipPlane i=ClipPlane0+i.

Referring now to step S130, the user-defined clipping process is applied in the object space, rather than in the eye space. Instead of transforming all vertex coordinates from object space to eye space for clipping, the user-defined clip planes specified at step S104 are transformed from eye space to object space and clipping is applied thereto. In this way, the computations required in transforming of the multiple vertex coordinates is replaced by less computations to transform the clip planes at step S106 to object space. In the most of the cases, the amount of vertex coordinates is much larger than amount of user-defined clip planes specified. By moving user-defined clipping to the object space, many computation cycles are saved, and thus, power consumption in mobile or hand-held devices with 3D imaging capability were reduced.

Conventional user clipping in eye space is determined by $P\_eye^T * V\_eye$. According to following transformation, $$P\_eye^{T}*V\_eye = P\_eye^{T}*(M*V\_obj)$$
$$= (P\_eye^{T}*M)*V\_obj$$
$$= P\_obj^{T}*V\_obj$$

where
$$P\_obj^T = P\_eye^{T}*M.$$

Thus, user clipping process of step S130 can be done with $P\_obj^T * V\_obj$, which is key to the method 100.

Since the vertex based lighting process is based on vertices in the eye space, the method 100 to perform clipping in object space will not be applicable to save computation when lighting is enabled. Instead, the conventional method 10 should be used if lighting is enabled. In OpenGL® and OpenGL® ES have an application programming interface (API) to enable and disable lighting such as using glEnable(GLenum,array).

Figure 5A:
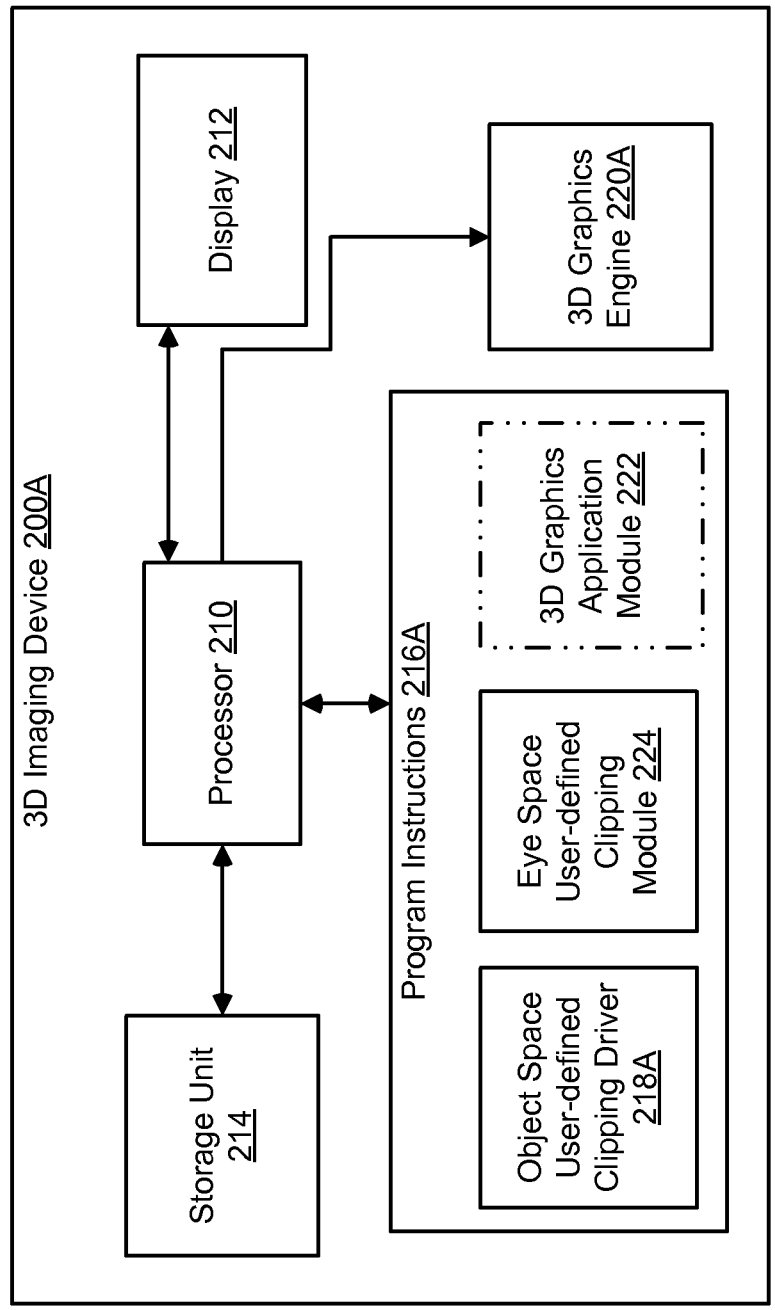
FIG. 5A illustrates a block diagram of a three-dimensional (3D) imaging device with an object space user-defined clipping driver implemented in software according to the present invention.
Figure 5B:
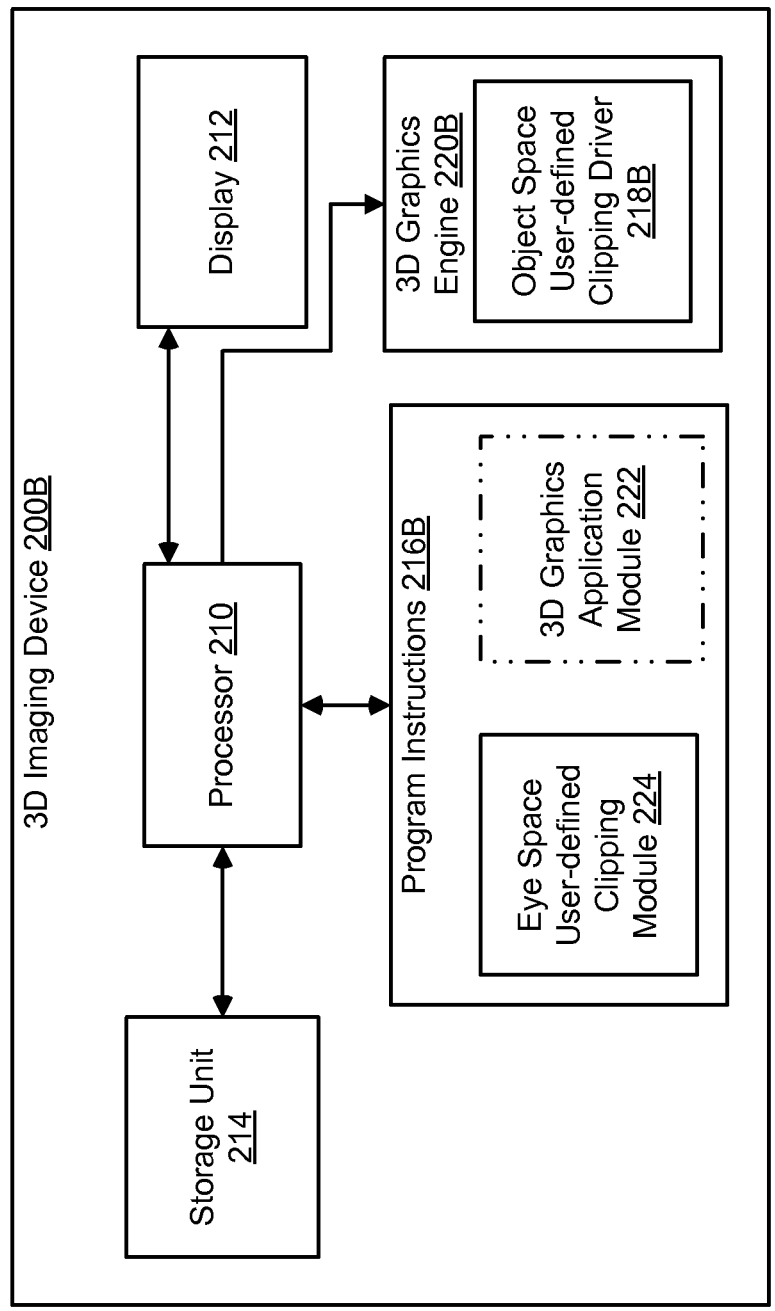
FIG. 5B illustrates a block diagram of a three-dimensional (3D) imaging device with an object space user-defined clipping driver implemented in hardware according to the present invention.
Figure 8:
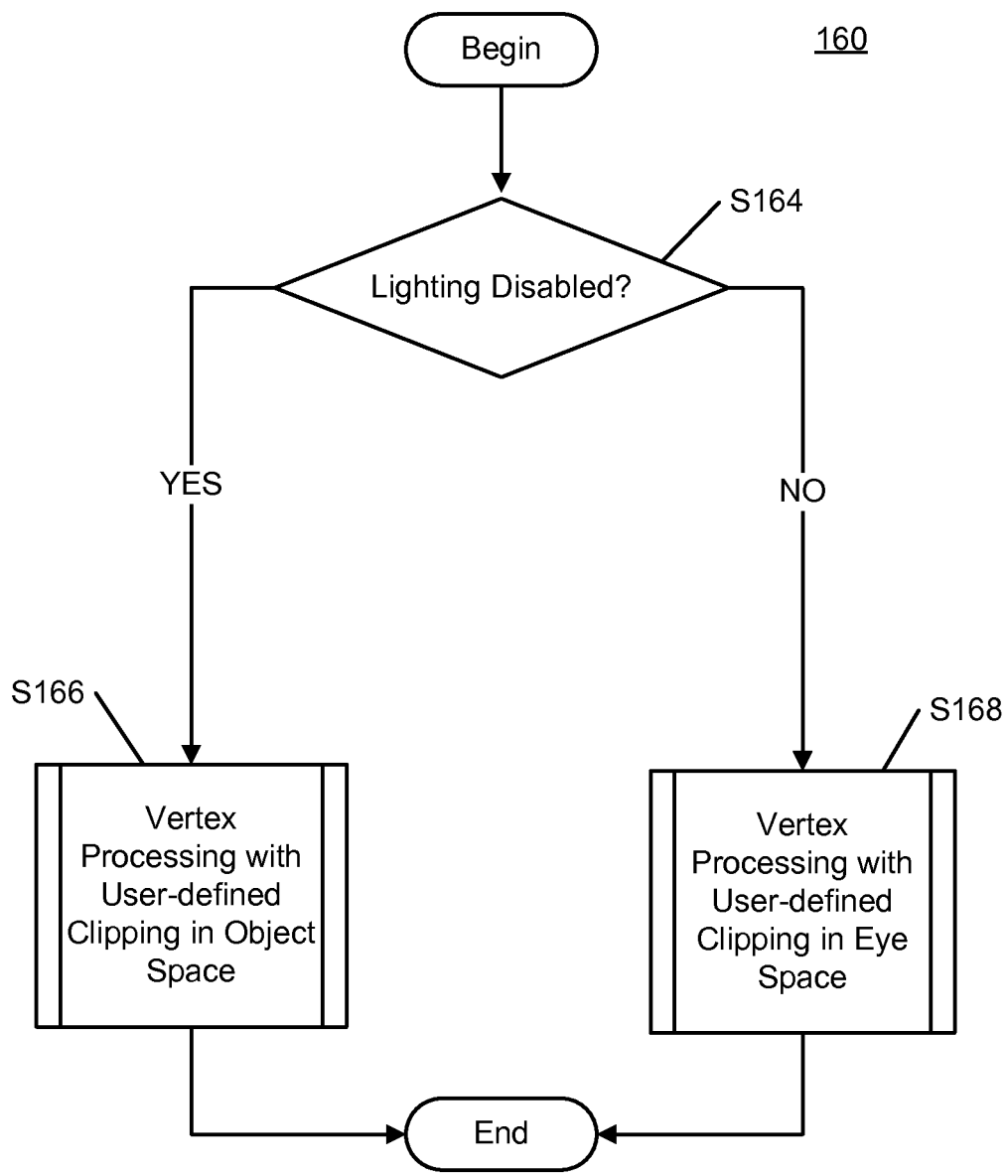
FIG. 8 illustrates a flowchart of the dual mode user-defined clipping method according to the present invention.

Referring now to FIG. 8, the dual mode user-defined clipping method 160 is shown for use in 3D imaging device 200A or 200B of FIG. 5A or 5B, respectively, and begins with step S164 where a determination is made whether lighting has been disabled. If the determination at step S164 is "YES," the step S164 is followed by step S166 where the vertex processing with user-defined clipping takes place in object space in accordance with the flowcharts of FIG. 3 or FIG. 4. On the other hand, if the determination at step S164 is "NO," then step S164 is followed by step S168 where the vertex processing with user-defined clipping takes place in eye space as disclosed in FIGS. 1 and 2. Thus, the driver 218A or 218B only needs to be operational when lighting is disabled.

Vertex based processing, of FIG. 4, is in inner loop of per-vertex operation in a graphics pipeline. By removing modelview transform per vertex, the system will process vertex data faster. Vertex-based processing processes the data per vertex. After the view volume clipping of step S134 and viewport on the screen, the processing is on a per-pixel level. Based on the data in each of the vertices of a polygon, all pixels within the polygon will be drawn/filled. The saved computation can be translated directly into power reduction.

Since the user clipping is done earlier, i.e., it is done in the object space rather than in the eye space, it is possible to apply the user-defined clipping process as a pre-processing in software before sending vertex coordinates into a digital signal processor (DSP) or a hardware-based graphics core, as best seen in FIG. 4. By doing so, the complexity of the graphics pipeline in the DSP or hardware graphics core is reduced, and, it is possible to enable the user clipping feature in a pre-developed graphics system. Vertex coordinates are assembled in S117 and clipped by user-defined clip planes in S131. Clipped vertex coordinates in object are sent into the 3D graphics engine 220A for further processing at step S132 for transformation into projection space.

Point

Referring now the primitive assembling of Step S117, if the primitive is a point, the Vertex object coordinates in object space S112 are V_obj. The vertex coordinates in eye space are V_eye, then $$V\_eye = M * V\_obj$$

Any input clip plane in object space at S104 is P. Model-View transformation matrix for the clip plane in S108 is Mc. Then, the clip plane in eye space, P_eye, is $$P\_eye = \text{Inv}\_Mc * P.$$

Transform the plane P from eye space to the point's object space at step S114 by the ModelView transformation matrix for the point, M. The clip plane in the point's object space, P_obj, is $$P\_obj = P\_eye^T * M.$$

Then, perform clipping in the point's object space according to step S130 or S131. As a proof set forth below, $P\_obj^T * V\_obj >= 0$ if and only if $P\_eye^T * V\_eye >= 0$. The Proof is defined by $$P\_obj^T * V\_obj = (P\_eye^T * M) * V\_obj$$
$$= P\_eye^T * (M * V\_obj)$$
$$= P\_eye^T * V\_eye$$

where vertex coordinates of the point in eye space, V_eye is transformed by the M from the coordinates in object space and is defined by $$V\_eye = M * V\_obj.$$

Line Segment

If the primitive is a line, the line can be described by two vertices at the ends. In object space, they are V_obj1 and V_obj2. To transform the line into eye space by ModelView transformation matrix M, $$V\_eye1 = M * V\_obj1;$$

and $$V\_eye2 = M * V\_obj2.$$

Any input clip plane in object space at S104 is P. ModelView transformation matrix for the clip plane in S108 is Mc. Then, the clip plane in eye space, P_eye, is defined by $$P\_eye = \text{Inv}\_Mc * P.$$

Transform the plane P from eye space to the line's object space at step S114 by the ModelView transformation matrix for the line, M. The clip plane in the line's object space, P_obj, is defined by $$P\_obj = P\_eye^T * M.$$

Then, perform the clipping in the line's object space according to step S130 or S131.

It is obvious that the line segment lies entirely in or out of the clip volume in object space if and only if it lies entirely in or out of the clip volume in eye space. The proof to prove that the clip point computed in eye space is the same one transformed from the clip point computed in object space is set forth below.

To proof the clip points are the same in both object space and eye space, define the clip point in object space as C_obj, and the clip point in eye space as C_eye. Assume t is a ratio of the clip point in the line clipped into the plane. In object space, then $$t\_obj = P\_obj^T * V\_obj2 / (P\_obj^T * V\_obj2 + P\_obj^T * V\_obj2)$$

and in eye space, $$t\_eye = P\_eye^T * V\_eye2 / (P\_eye^T * V\_eye2 + P\_eye^T * V\_eye2).$$

The clip point in object space, $$C\_obj = t\_obj * V\_obj1 + (1 - t\_obj) * V\_obj2.$$

The clip point in eye space, $$C\_eye = t\_eye * V\_eye1 + (1 - t\_eye) * V\_eye2.$$

If t_eye=t_obj, the clip point in eye space should be the clip point in object space transformed by the line's ModelView transformation matrix, M. The Proof for C_eye is defined by $$C\_eye := t\_eye * V\_eye1 + (1 - t\_eye) * V\_eye2$$
$$= t\_obj * (M * V\_obj1) + (1 - t\_obj) * (M * V\_obj2)$$
$$= M * (t\_obj * V\_obj1 + (1 - t\_obj) * V\_obj2)$$
$$= M * C\_obj.$$

Polygon

Since each edge of the polygon is handled as a line segment as described above, if it is true for line, it is true for polygon.

In view of the foregoing, there are three major differences between the conventional approach and the present invention. First, in the present invention, the vertex coordinates are not transformed from the object space to the eye space until just before projection transformation at step S132B or converted directly into projection space. Second, in the present invention, the user-defined clip planes are transformed from the eye space to the object space. Third, in the present invention, clipping is determined by IF $(P\_obj^T * V\_obj) >= 0$ instead of IF $(P\_eye^T * V\_eye) >= 0$.

Figure 6:
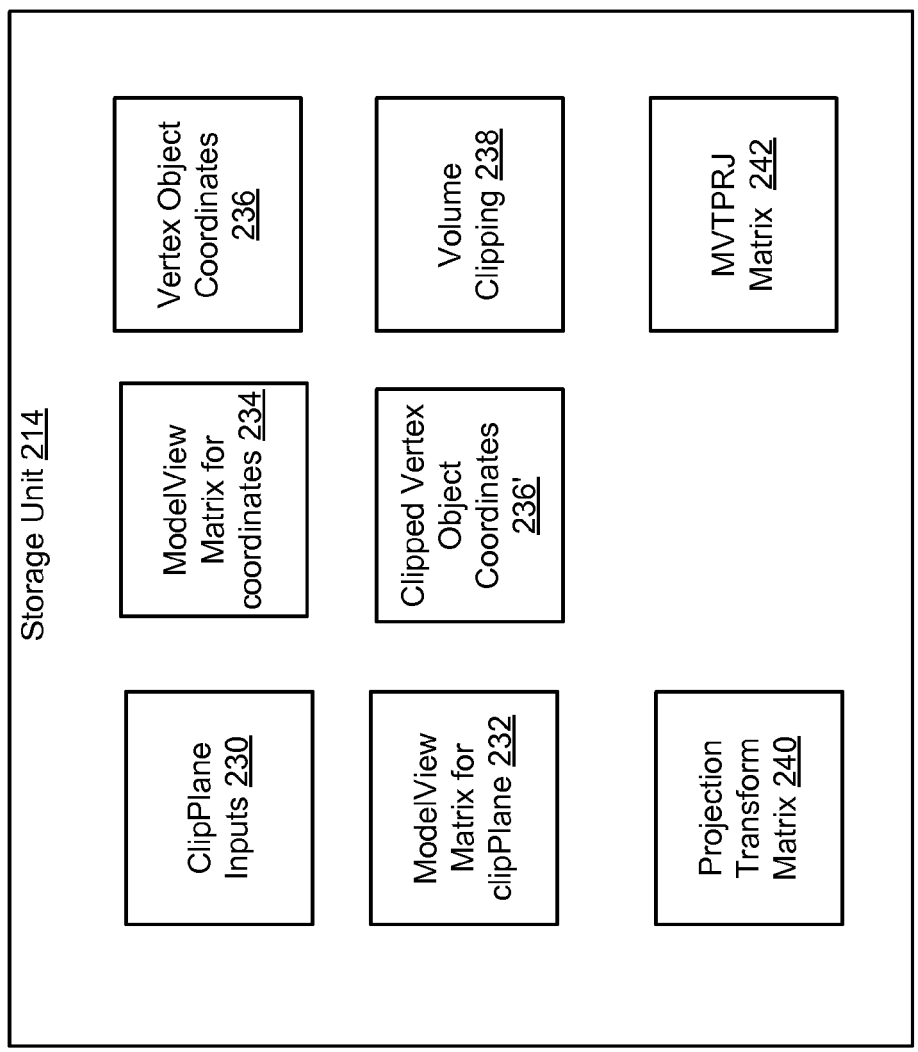
FIG. 6 illustrates a block diagram of stored items in the storage unit of the devices in FIG. 5A or 5B.

Referring again to FIGS. 5A and 6, the three-dimensional (3D) imaging device 200A will now be described in detail. The device 200A may be a mobile phone or other hand-held computing device with communication equipment (now shown) for permitting two-way wired or wireless communications such as a personal digital assistant (PDA), and a mobile, cellular or satellite telephone with video capability. The device 200A may be a PC, laptop or other wireless computing devices. The device 200A includes a processor 210 and display 212 for displaying the 2-D bitmap on the screen. The storage unit 214 provides the necessary storage for the vertex object coordinates 236, clipped vertex coordinates in object space (CV_obj) 236', clip planes 230, and modelview matrix for the planes 232 and coordinates 234, the projection transformation matrix 240, and MVTPRJ_matrix 242. The storage unit 214 also includes the volume clipping 238. The storage unit 214 includes one or more suitable computer readable storage medium for use in the type of device 200A.

The device 200A further includes program instructions 216A with the object space user-defined clipping driver 218A or pre-processing stage and a 3D graphics application module 222 such as without limitation having game content for playing games, simulators, CAD, virtual reality graphics. The eye space user-defined clipping module 224 is software for the vertex processing with user-defined clipping in eye space shown in FIGS. 1 and 2 is integrated into the program instructions 216A for use in the dual mode user-defined clipping method 160. Nevertheless, for dual-mode operation, the eye space user-defined clipping module 224 may also be hardware-based and would be removed from the program instructions of 216B.

Referring now to FIG. 5B, the three-dimensional (3D) imaging device 200B depicts a hardware implementation of the object space user-defined clipping driver 218B. The device 200B like device 200A may be a mobile phone or other hand-held computing device with communication equipment (now shown) for permitting two-way wired or wireless communications such as a personal digital assistant (PDA), and a mobile, cellular or satellite telephone with video capability. The device 200B may be a PC or laptop. The device 200B includes a processor 210 and display 212 for displaying the 2-D bitmap on the screen and a storage unit 214.

The device 200B further includes program instructions 216B with a 3D graphics application module 222 (shown in phantom) such as without limitation having game content for playing games, simulators, CAD, virtual reality graphics. The eye space user-defined clipping module 224 is software for the vertex processing with user-defined clipping in eye space shown in FIGS. 1 and 2 is integrated into the program instructions 216B for use in the dual mode user-defined clipping method 160.

In the hardware implementation, the 3D graphics engine 220B integrates or interfaces with the hardware-based object space user-defined clipping driver 218B. Nevertheless, for dual-mode operation, the eye space user-defined clipping module 224 may also be hardware-based and would be removed from the program instructions of 216B.

Figure 7A:
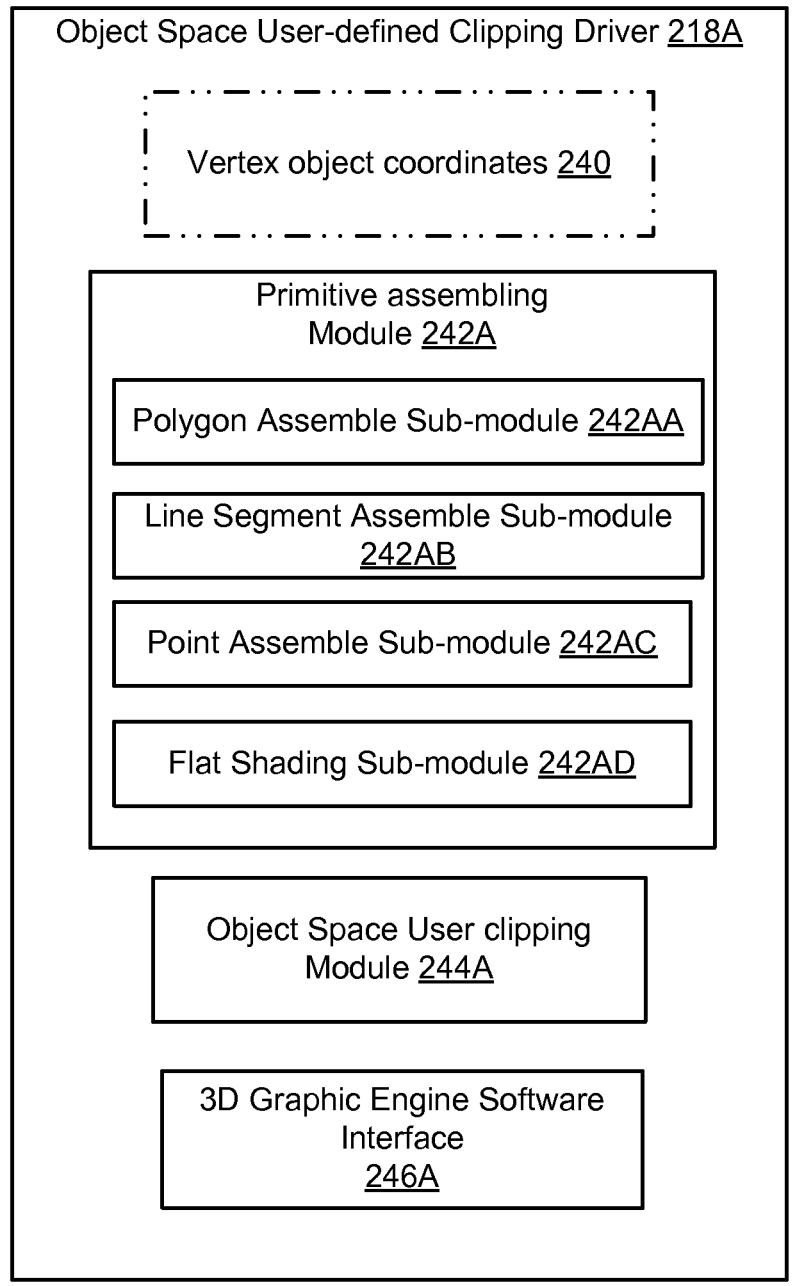
FIG. 7A illustrates a general block diagram of the object space user-defined clipping driver of the device in FIG. 5A.

With specific reference to FIG. 7A, the user clipping is done earlier as a pre-processing stage or driver 218A in software before sending vertex coordinates into a DSP or a hardware graphics core of the 3D graphics engine 220A. The software-based object space user-defined clipping driver 218A includes vertex object coordinates 240 in object space (shown in phantom). The driver 218A further includes a primitive assembling module 242A and an object space user-defined clipping module 244A. The primitive assembling module 242A includes a polygon assemble sub-module 242AA, a line segment assemble sub-module 242AB, a point assemble sub-module 242AC and a flat shading sub-module 242AD. The primitive assembling module 242A includes the program instructions for carrying out the processes of steps of S118, S120, S122 and S124. The driver 218A also includes a 3D graphics engine software interface 246A to interface the driver 218A with the 3D graphics engine 220A.

Figure 7B:
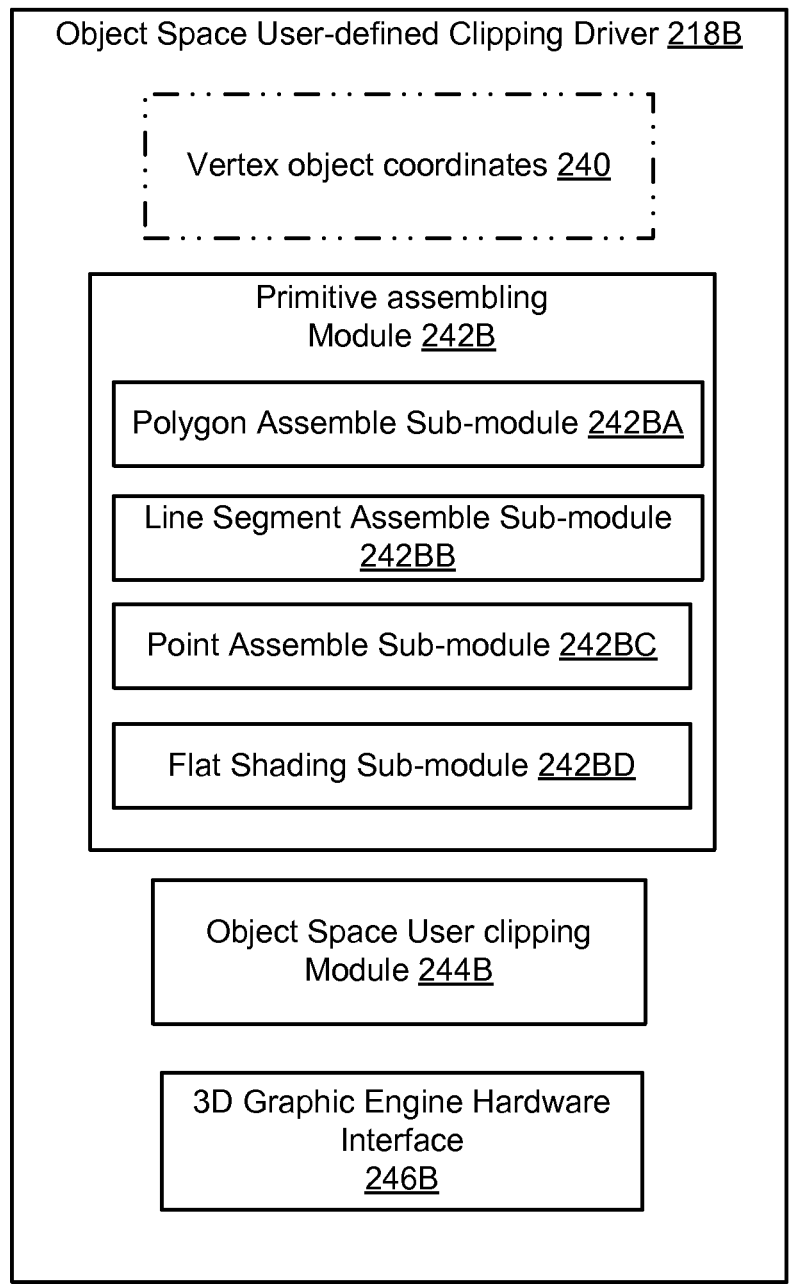
FIG. 7B illustrates a general block diagram of the object space user-defined clipping driver of the device in FIG. 5B.

With specific reference to FIG. 7B, the user clipping is done as a pre-processing stage or driver 218B in hardware before sending vertex coordinates into a DSP or a hardware graphics core of the 3D graphics engine 220B. The hardware-based object space user-defined clipping driver 218B includes vertex object coordinates 240 in object space (shown in phantom). The driver 218B further includes a primitive assembling module 242B and an object space user-defined clipping module 244B. The primitive assembling module 242B includes a polygon assemble sub-module 242BA, a line segment assemble sub-module 242BB, a point assemble sub-module 242BC and a flat shading sub-module 242BD. The primitive assembling module 242B carries out the processes of steps of S118, S120, S122 and S124. The driver 218B also includes a 3D graphics engine hardware interface 246B to interface the driver 218B with the 3D graphics engine 220B.

It will be appreciated by those of ordinary skill in the art that the method and device for performing user-defined clipping in object space according to the present invention has higher performance and requires less power consumption by avoiding generation of eye coordinates if there is no lighting.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An imaging apparatus comprising:
a processor configured to determine whether lighting is enabled or disabled,
wherein, in response to the determination that lighting is enabled, the processor is configured to perform vertex coordinate processing of vertex coordinates in eye space to create clipped vertex coordinates in the eye space, and
wherein, in response to the determination that lighting is disabled, the processor is configured to perform vertex coordinate processing of vertex coordinates in object space to create clipped vertex coordinates in the object space.

2. The apparatus of claim 1, wherein the processor is configured to perform the vertex processing of the vertex coordinates in the eye space when lighting is enabled with a first clipping driver, and perform the vertex processing of the vertex coordinates in the object space when lighting is disabled with a second clipping driver.

3. The apparatus of claim 2, wherein the first clipping driver executes on the processor when lighting is enabled, and wherein the second clipping driver executes on the processor when lighting is disabled.

4. The apparatus of claim 1, wherein the processor is configured to perform primitive assembling in the object space using the vertex coordinates in the object space when lighting is disabled.

5. The apparatus of claim 4, wherein the processor is configured to selectively perform one of polygon assembling, line assembling and point assembling of the vertex coordinates in the object space to perform the primitive assembling in the object space when lighting is disabled.

6. The apparatus of claim 1, wherein the processor is configured to perform primitive assembling in the eye space using the vertex coordinates in the eye space when lighting is enabled.

7. The apparatus of claim 6, wherein the processor is configured to selectively perform one of polygon assembling, line assembling and point assembling of the vertex coordinates in the eye space to perform the primitive assembling in the eye space when lighting is enabled.

8. The apparatus claim 1, wherein the processor is configured to transform the vertex coordinates in the eye space to a projection space when lighting is enabled.

9. The apparatus claim 1, wherein the processor is configured to perform combined modelview and projection transformation in the object space when lighting is disabled.

10. The apparatus of claim 9, wherein the processor is configured to transform the vertex coordinates in the object space directly to a projection space by multiplying one vector by a matrix to perform the combined modelview and projection transformation in the object space when lighting is disabled.

11. The apparatus of claim 10, wherein the matrix is a combined matrix (MVTPRJ_matrix) of a modelview matrix and a projection matrix, and wherein a result of the multiplication yields the vertex coordinates (V_prj) in the projection space defined by at least one of:

$$V\_prj=CV\_obj*MVTPRJ\_matrix \text{ and}$$

$$V\_prj=V\_obj*MVTPRJ\_matrix$$

where CV_obj is clipped vertex coordinates in the object space and V_obj is non-clipped vertex coordinates in the object space.

12. The apparatus of claim 1, wherein, when lighting is disabled, the processor is configured to perform user-defined clipping to convert clip planes (P_eye) in the eye space to clip planes (P_obj) in the object space defined by $$P\_eye=\text{Inv}\_Mc*P \text{ and}$$

$$P\_obj=P\_eye^T*M$$

where P is an input clip plane, Mc is a modelview matrix for the clip plane, Inv_Mc is the inverse matrix of the modelview matrix Mc, M is a modelview matrix for coordinates, T indicates a transpose operation of a matrix or vector, and * denotes matrix multiplication.

13. A graphics processor method for dual-mode processing of user-defined clipping, the method comprising:
   determining, via an imaging device, whether lighting is enabled or disabled;
   in response to the determination that lighting is disabled, processing, via the imaging device, one or more vertex coordinates in object space to create clipped vertex coordinates in the object space; and
   in response to the determination that lighting is enabled, processing, via the imaging device, one or more vertex coordinates in eye space to create clipped vertex coordinates in the eye space.

14. The method of claim 13, wherein processing the one or more vertex coordinates in the eye space when lighting is determined to be enabled comprises executing a first clipping driver on the imaging device to process the one or more vertex coordinates in the eye space when lighting is determined to be enabled, and wherein processing the one or more vertex coordinates in the object space when lighting is determined to be disabled comprises executing a second clipping driver on the imaging device to process the one or more vertex coordinates in the object space when lighting is determined to be disabled.

15. The method of claim 13, further comprising:
   performing primitive assembling in the object space using the vertex coordinates in the object space when lighting is disabled.

16. The method of claim 15, wherein performing the primitive assembling comprises selectively performing one of polygon assembling, line assembling and point assembling of the vertex coordinates in the object space when lighting is disabled.

17. The method of claim 13, further comprising:
   performing primitive assembling in the eye space using the vertex coordinates in the eye space when lighting is enabled.

18. The method of claim 17, wherein performing the primitive assembling comprises selectively performing one of polygon assembling, line assembling and point assembling of the vertex coordinates in the eye space when lighting is enabled.

19. The method claim 13, further comprising:
   transforming the vertex coordinates in the eye space to a projection space when lighting is enabled.

20. The method of claim 13, further comprising:
   performing combined modelview and projection transformation in the object space when lighting is disabled.

21. The method of claim 20, wherein performing the combined modelview and projection transformation comprises transforming the vertex coordinates in the object space directly to a projection space by multiplying one vector by a matrix.

22. The method of claim 21, wherein the matrix is a combined matrix (MVTPRJ_matrix) of a modelview matrix and a projection matrix, and wherein a result of the multiplication yields the vertex coordinates (V_prj) in the projection space defined by at least one of:

$$V\_prj=CV\_obj*MVTPRJ\_matrix \text{ and}$$

$$V\_prj=V\_obj*MVTPRJ\_matrix$$

where CV_obj is clipped vertex coordinates in the object space, and V_obj is non-clipped vertex coordinates in the object space.

23. The method of claim 13, wherein, when lighting is disabled, the method further comprising:
   performing user-defined clipping to convert clip planes (P_eye) in the eye space to clip planes (P_obj) in the object space defined by $$P\_eye=\text{Inv}\_Mc*P \text{ and}$$

$$P\_obj=P\_eye^T*M$$

where P is an input clip plane, Mc is a modelview matrix for the clip plane, Inv_Mc is the inverse matrix of the modelview matrix Mc, M is a modelview matrix for coordinates, T indicates a transpose operation of a matrix or vector, and * denotes matrix multiplication.

24. A device comprising:
   means for determining whether lighting is enabled or disabled;
   in response to the determination that lighting is disabled, means for processing one or more vertex coordinates in object space to create clipped vertex coordinates in the object space; and
   in response to the determination that lighting is enabled, means for processing one or more vertex coordinates in eye space to create clipped vertex coordinates in the eye space.

25. The device of claim 24, wherein the means for processing the one or more vertex coordinates in the eye space when lighting is determined to be enabled comprises means for executing a first clipping driver on the imaging device to process the one or more vertex coordinates in the eye space when lighting is determined to be enabled, and wherein the means for processing the one or more vertex coordinates in the object space when lighting is determined to be disabled comprises means for executing a second clipping driver on the imaging device to process the one or more vertex coordinates in the object space when lighting is determined to be disabled.

26. The device of claim 24, further comprising:
means for performing primitive assembling in the object space using the vertex coordinates in the object space when lighting is disabled.

27. The device of claim 26, wherein the means for performing the primitive assembling comprises means for selectively performing one of polygon assembling, line assembling and point assembling of the vertex coordinates in the object space when lighting is disabled.

28. The device of claim 24, further comprising:
means for performing primitive assembling in the eye space using the vertex coordinates in the eye space when lighting is enabled.

29. The device of claim 28, wherein the means for performing the primitive assembling comprises means for selectively performing one of polygon assembling, line assembling and point assembling of the vertex coordinates in the eye space when lighting is enabled.

30. The device claim 24, further comprising:
means for transforming the vertex coordinates in the eye space to a projection space when lighting is enabled.

31. The device of claim 24, further comprising:
means for performing combined modelview and projection transformation in the object space when lighting is disabled.

32. The device of claim 31, wherein the means for performing in the combined modelview and projection transformation comprises means for transforming the vertex coordinates in the object space directly to a projection space by multiplying one vector by a matrix.

33. The device of claim 32, wherein the matrix is a combined matrix (MVTPRJ_matrix) of a modelview matrix and a projection matrix, and wherein a result of the multiplication yields the vertex coordinates (V_prj) in the projection space defined by at least one of:

$$V\_prj = CV\_obj * MVTPRJ\_matrix \text{ and}$$

$$V\_prj = V\_obj * MVTPRJ\_matrix$$

where CV_obj is clipped vertex coordinates in the object space, and V_obj is non-clipped vertex coordinates in the object space.

34. The device of claim 24, wherein, when lighting is disabled, the device further comprising:
means for performing user-defined clipping to convert clip planes (P_eye) in the eye space to clip planes (P_obj) in the object space defined by $$P\_eye = Inv\_Mc * P \text{ and}$$

$$P\_obj = P\_eye^T * M$$

where P is an input clip plane, Mc is a modelview matrix for the clip plane, Inv_Mc is the inverse matrix of the modelview matrix Mc, M is a modelview matrix for coordinates, T is a transpose of a matrix or vector, and * denotes matrix multiplication.

35. A non-transitory computer readable storage medium comprising instructions that cause one or more processors to:
determine whether lighting is enabled or disabled;
in response to the determination that lighting is enabled, the instructions cause the one or more processors to perform vertex coordinate processing of vertex coordinates in eye space to create clipped vertex coordinates in the eye space; and
in response to the determination that lighting is disabled, the instructions cause the one or processors to perform vertex coordinate processing of vertex coordinates in object space to create clipped vertex coordinates in the object space.

36. The computer readable storage medium of claim 35, further comprising instructions that cause the one or more processors to:
perform primitive assembling in the object space using the vertex coordinates in the object space when lighting is disabled.

37. The computer readable storage medium of claim 36, wherein the instructions that cause the one or more processors to perform the primitive assembling comprise instructions that cause the one or more processors to selectively perform one of polygon assembling, line assembling and point assembling of the vertex coordinates in the object space when lighting is disabled.

38. The computer readable storage medium of claim 35, further comprising instructions that cause the one or more processors to:
perform primitive assembling in the eye space using the vertex coordinates in the eye space when lighting is enabled.

39. The computer readable storage medium of claim 38, wherein the instructions that cause the one or more processors to perform the primitive assembling comprise instructions that cause the one or more processors to selectively perform one of polygon assembling, line assembling and point assembling of the vertex coordinates in the eye space when lighting is enabled.

40. The computer readable storage medium claim 35, further comprising instructions that cause the one or more processors to:
transform the vertex coordinates in the eye space to a projection space when lighting is enabled.

41. The computer readable storage medium of claim 35, further comprising instructions that cause the one or more processors to:
perform combined modelview and projection transformation in the object space when lighting is disabled.

42. The computer readable storage medium of claim 41, wherein the instructions that cause the one or more processors to perform the combined modelview and projection transformation comprise instructions that cause the one or more processors to transform the vertex coordinates in the object space directly to a projection space by multiplying one vector by a matrix.

43. The computer readable storage medium of claim 42, wherein the matrix is a combined matrix (MVTPRJ_matrix) of a modelview matrix and a projection matrix, and wherein a result of the multiplication yields the vertex coordinates (V_prj) in the projection space defined by at least one of:

$$V\_prj = CV\_obj * MVTPRJ\_matrix \text{ and}$$

$$V\_prj = V\_obj * MVTPRJ\_matrix$$

where CV_obj is clipped vertex coordinates in the object space, and V_obj is non-clipped vertex coordinates in the object space.

44. The computer readable storage medium of claim 35, further comprising instructions that cause the one or more processors, when lighting is disabled, to:
perform user-defined clipping to convert clip planes (P_eye) in the eye space to clip planes (P_obj) in the object space defined by $$P\_eye = Inv\_Mc * P \text{ and}$$

$$P\_obj = P\_eye^T * M$$

where P is an input clip plane, Mc is a modelview matrix for the clip plane, Inv_Mc is the inverse matrix of the modelview matrix Mc, M is a modelview matrix for coordinates, T is a transpose of a matrix or vector, and * denotes matrix multiplication.

45. A graphics processor method for dual-mode processing of user-defined clipping comprising:
- determining, via an imaging device, whether lighting is enabled or disabled;
- in response to the determination that lighting is disabled, performing, via the imaging device, object space vertex coordinate processing with object space user-defined clipping to create clipped vertex coordinates in object space; and
- in response to the determination that lighting is enabled, performing, via the imaging device, eye space vertex coordinate processing with eye space user-defined clipping to create clipped vertex coordinates in eye space.

46. The method of claim 45, further comprising:
- transforming the clipped vertex coordinates in the object space and non-clipped vertex coordinates in the object space directly to a projection space, when lighting is determined to be disabled.

47. The method of claim 45, further comprising:
- transforming the clipped vertex coordinates in the eye space and non-clipped vertex coordinates in the eye space to a projection space, when lighting is determined to be enabled.

* * * * *